(12) United States Patent
Hsieh et al.

(10) Patent No.: US 7,613,093 B2
(45) Date of Patent: Nov. 3, 2009

(54) DUTY RATIO CONTROL APPARATUS FOR PRE-PIT DETECTION OR HEADER DETECTION OF AN OPTICAL STORAGE MEDIUM

(75) Inventors: Bing-Yu Hsieh, Taipei (TW); Chih-Ching Chen, Miao-Li County (TW)

(73) Assignee: MediaTek Inc., Hsin-Chu Hsien (TW)

( * ) Notice: Subject to any disclaimer, the term of this patent is extended or adjusted under 35 U.S.C. 154(b) by 367 days.

(21) Appl. No.: 11/162,948

(22) Filed: Sep. 28, 2005

(65) Prior Publication Data

US 2007/0070866 A1 Mar. 29, 2007

(51) Int. Cl.
G11B 11/00 (2006.01)
(52) U.S. Cl. .................. 369/53.31; 369/124.07
(58) Field of Classification Search .......... 369/100, 369/59, 44.26, 44.34, 275.3, 44.13, 124.01, 369/124.14, 47, 48, 124.1, 124, 124.12, 32, 369/54

See application file for complete search history.

(56) References Cited

U.S. PATENT DOCUMENTS

| | | | | |
|---|---|---|---|---|
| 4,186,437 A | * | 1/1980 | Cuk | ............................ 363/65 |
| 5,710,750 A | * | 1/1998 | Tachibana | ................ 369/59.16 |
| 5,930,222 A | | 7/1999 | Yoshida et al. | |
| 6,023,234 A | | 2/2000 | Fukuoka | |
| 6,058,093 A | | 5/2000 | Kato et al. | |
| 6,091,682 A | | 7/2000 | Hikima | |
| 6,091,688 A | | 7/2000 | Tanoue et al. | |
| 6,104,682 A | * | 8/2000 | Konishi | .................... 369/44.34 |
| 6,272,089 B1 | * | 8/2001 | Kato | ........................ 369/53.41 |
| 6,337,838 B1 | | 1/2002 | Hikima et al. | |
| 6,339,581 B1 | | 1/2002 | Yoshida et al. | |
| 6,341,110 B1 | | 1/2002 | Tawaragi | |
| 6,359,848 B1 | * | 3/2002 | Van Den Enden | ........ 369/53.29 |
| 6,466,533 B2 | | 10/2002 | Hikima et al. | |
| 6,519,214 B1 | | 2/2003 | Hikima | |
| 6,545,972 B1 | | 4/2003 | Kato et al. | |
| 6,603,726 B1 | | 8/2003 | Yoshida et al. | |
| 6,639,882 B2 | | 10/2003 | Hikima | |
| 6,707,780 B2 | | 3/2004 | Hikima | |
| 6,747,932 B1 | | 6/2004 | Jeon | |
| 6,754,157 B2 | | 6/2004 | Osada | |
| 6,757,233 B2 | | 6/2004 | Akabane et al. | |
| 6,778,104 B2 | * | 8/2004 | Chen et al. | ..................... 341/59 |
| 6,801,488 B2 | * | 10/2004 | Kato et al. | ............... 369/47.28 |
| 6,819,645 B2 | | 11/2004 | Jeon et al. | |
| 6,882,609 B2 | | 4/2005 | Williams et al. | |
| 6,914,544 B2 | | 7/2005 | Nakagawa et al. | |
| 7,109,462 B2 | * | 9/2006 | Tateishi et al. | ............... 250/205 |
| 2002/0039331 A1 | * | 4/2002 | Park | ........................ 369/44.26 |

(Continued)

*Primary Examiner*—Paul Huber
(74) *Attorney, Agent, or Firm*—Winston Hsu

(57) ABSTRACT

A pre-pit signal generating device includes: a first slicer for generating a sliced signal corresponding to a push-pull signal based on a first reference level; a duty ratio controller coupled to the first slicer for adjusting the first reference level or the push-pull signal to control a duty ratio of the sliced signal to a predetermined ratio; a reference level generator coupled to the duty ratio controller for generating a second reference level corresponding to the first reference level; and a second slicer coupled to the reference level generator for generating a first pre-pit signal corresponding to the push-pull signal based on the second reference level.

38 Claims, 12 Drawing Sheets

U.S. PATENT DOCUMENTS

| | | |
|---|---|---|
| 2002/0105870 A1* | 8/2002 | Hikima .................... 369/47.25 |
| 2002/0105871 A1 | 8/2002 | Akabane et al. |
| 2002/0105895 A1* | 8/2002 | Tanaka ................. 369/124.12 |
| 2002/0114248 A1 | 8/2002 | Kato et al. |
| 2002/0114249 A1 | 8/2002 | Kato et al. |
| 2003/0086357 A1 | 5/2003 | Hikima |
| 2003/0123350 A1 | 7/2003 | Kim |
| 2004/0066724 A1* | 4/2004 | Hsu ........................ 369/59.15 |
| 2005/0088924 A1* | 4/2005 | Hatanaka et al. ......... 369/44.25 |
| 2005/0134341 A1* | 6/2005 | Lee ............................ 327/172 |
| 2005/0190671 A1* | 9/2005 | Chen et al. ............... 369/47.27 |
| 2007/0008840 A1* | 1/2007 | Martens et al. .......... 369/44.29 |

* cited by examiner

DUTY RATIO CONTROL APPARATUS FOR PRE-PIT DETECTION OR HEADER DETECTION OF AN OPTICAL STORAGE MEDIUM

BACKGROUND

The present disclosure relates to optical storage techniques, and more particularly, to duty ratio loops for use in pre-pit detection or header region detection.

In some recordable optical storage media, such as the DVD-R or DVD-RW disc, the physical address information is recorded in the form of pre-pits on the land portions of the disc. The pre-pits formed on the land portions are referred to as land pre-pits (LPPs).

When recording data into a DVD-R/RW disc or reproducing data from the DVD-R/RW disc, the physical address information is obtained by detecting the land pre-pits. In the conventional art, the land pre-pits are detected as follows: Firstly, a push-pull signal is extracted from the DVD-R/RW disc. Then, a slicer is typically employed to slice the push-pull signal on a basis of a predetermined slicing level to generate a binary signal, which is referred to as a land pre-pit signal (LPP signal). According to the LPP signal generated from the slicer, address information of the DVD-R/RW disc and a recording clock signal for use in the recording operation and other similar operations are generated. Accordingly, the pre-pit detecting operation greatly affects the accessing performance of the DVD-R/RW disc.

However, as is well known in the art, the level of the section corresponding to the pre-pit in the push-pull signal is not constant. Conversely, it fluctuates depending on the pickup reading conditions such as the tracking position. Thus, it is difficult to set a proper slicing level for the slicer to slice the push-pull signal.

Differing from the DVD-R/RW disc, the address and location information, such as track and sector numbers, of a DVD-RAM disc are recorded in the header region disposed between adjacent sectors. As is well known in the art, a push-pull signal extracted from the DVD-RAM disc has a rapid signal change in the header region due to a high frequency signal of the header information recorded on the header region.

Reliable detection of a header region is essential to control the rotation of the DVD-RAM disc and is required to precisely read information recorded on a header region.

SUMMARY

An exemplary embodiment of a pre-pit signal generating device is disclosed comprising: a first slicer for generating a sliced signal corresponding to a push-pull signal based on a first reference level; a duty ratio controller coupled to the first slicer for adjusting the first reference level or the push-pull signal to control a duty ratio of the sliced signal to a predetermined ratio; a reference level generator coupled to the duty ratio controller for generating a second reference level corresponding to the first reference level; and a second slicer coupled to the reference level generator for generating a first pre-pit signal corresponding to the push-pull signal based on the second reference level.

An exemplary embodiment of a detecting device for detecting a header region of an optical storage medium is disclosed comprising: a first slicer for generating a fist sliced signal corresponding to a push-pull signal retrieved from the optical storage medium based on a first reference level; a first duty ratio controller coupled to the first slicer for adjusting the first reference level or the push-pull signal to control a duty ratio of the first sliced signal to a first predetermined ratio; a first reference level generator coupled to the first duty ratio controller for generating a second reference level corresponding to the first reference level; a second slicer for generating a second sliced signal corresponding to the push-pull signal based on a third reference level; a second duty ratio controller coupled to the second slicer for adjusting the third reference level or the push-pull signal to control a duty ratio of the second sliced signal to a second predetermined ratio greater than the first predetermined ratio; a second reference level generator coupled to the second duty ratio controller for generating a fourth reference level corresponding to the third reference level; and a header region detecting module coupled to the first and second reference level generators for detecting a header region of the push-pull signal according to the second and fourth reference levels.

An exemplary embodiment of a detecting device for detecting a header region of an optical storage medium is disclosed comprising: a slicer for generating a sliced signal corresponding to a push-pull signal retrieved from the optical storage medium based on a first reference level; a duty ratio controller coupled to the slicer for adjusting the first reference level or the push-pull signal to control a duty ratio of the sliced signal to a predetermined ratio; a reference level generator coupled to the duty ratio controller for generating a second reference level corresponding to the first reference level; and a header region detecting module coupled to the reference level generator for detecting a header region of the push-pull signal according to the second reference level and a third reference level corresponding to the second reference level.

An exemplary embodiment of a duty ratio control loop is disclosed comprising: a slicer for slicing an incoming signal based on a reference level to generate a sliced signal; and a duty ratio controller coupled to the slicer for adjusting the reference level or the incoming signal to control a duty ratio of the sliced signal to a predetermined ratio; wherein the predetermined ratio is either greater than 0.6 or less than 0.4.

These and other objectives will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". In addition, the term "couple" is intended to mean either an indirect or a direct electrical connection. Accordingly, if one device is coupled to another device, that connection may be through a direct electrical connection, or through an indirect electrical connection via other devices and connections.

Figure 1:
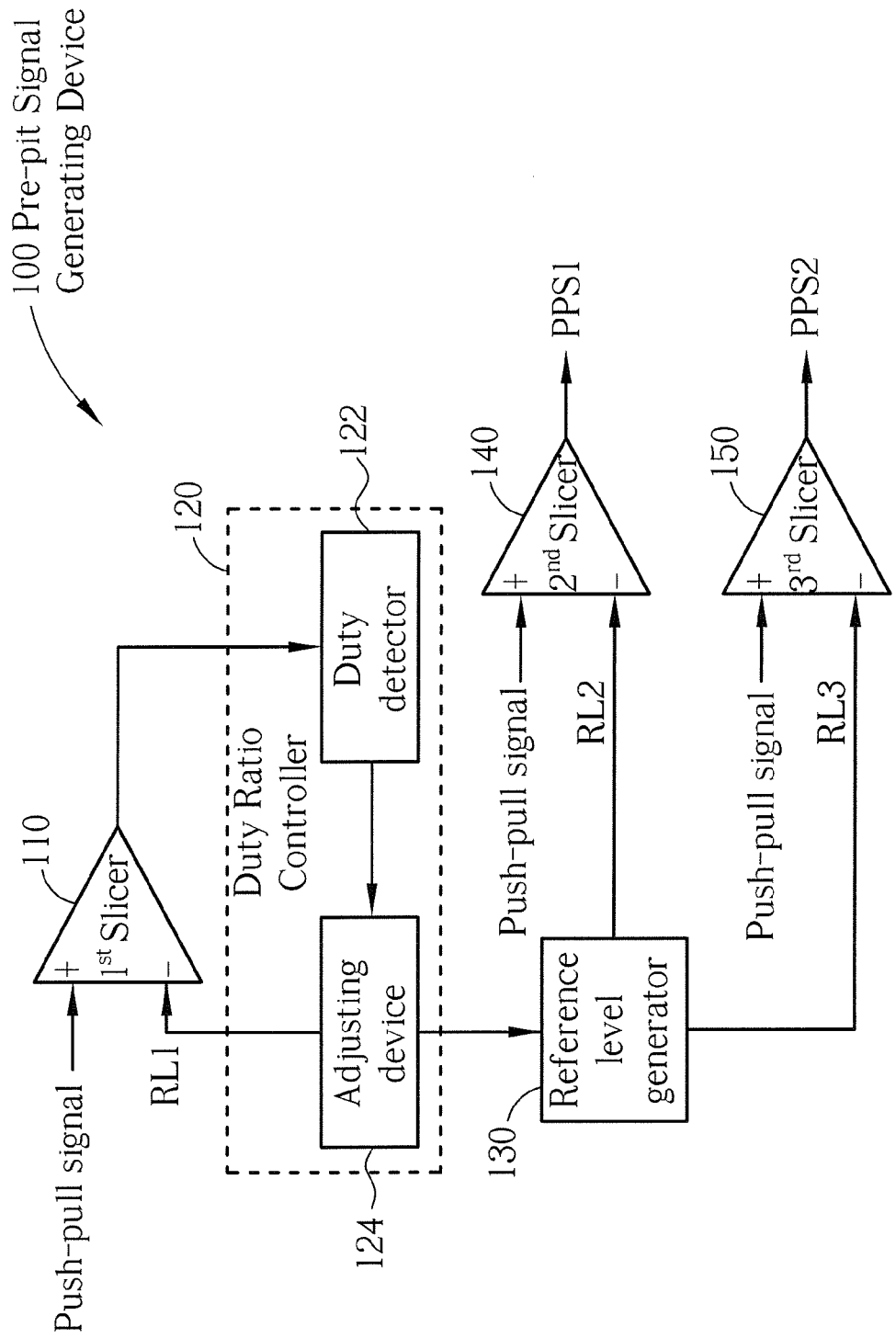
FIG. 1 is a simplified block diagram of a pre-pit signal generating device according to one embodiment.

Please refer to FIG. 1, which shows a simplified block diagram of a pre-pit signal generating device 100 according to one embodiment. As shown, the pre-pit signal generating device 100 comprises a first slicer 110, a duty ratio controller 120, a reference level generator 130, a second slicer 140, and a third slicer 150. The first slicer 110 is arranged for slicing a push-pull signal extracted from an optical storage medium (e.g., a DVD-R or DVD-RW disc) based on a first reference level RL1 to generate a sliced signal. The sliced signal is a binary signal. The duty ratio controller 120 is coupled to the first slicer 110 for detecting a duty ratio of the sliced signal generated by the first slicer 110 and adjusting the first reference level RL1 to control the duty ratio of the sliced signal to a predetermined ratio. The duty ratio controller 120 of this embodiment comprises a duty detector 122 and an adjusting device 124 coupled to the duty detector 122. The duty detector 122 is arranged for detecting the duty ratio of the sliced signal, and the adjusting device 124 is for adjusting the first reference level RL1 according to the detecting result of the duty detector 122. In one aspect, the combination of the first slicer 110 and the duty ratio controller 120 functions as a duty ratio control loop. In practice, the duty ratio controller 120 may be implemented in analog, digital, or a hybrid of analog and digital techniques.

The push-pull signal applied to the first slicer 110 is a composite signal where the land pre-pit information of the optical storage medium is piggybacked onto the wobble signal components. The duty ratio controller 120 of this embodiment adaptively adjusts the first reference level RL1 utilizing a feedback control approach so that the first reference level RL1 is below the peak level of the wobble signal components within the push-pull signal. To achieve this, the predetermined ratio may be set to a value less than 0.4. For example, the predetermined ratio may be selected from a range between 0.05 and 0.4. Preferably, the predetermined ratio is between 0.1 and 0.2. Note that, if the push-pull signal is inverted before being applied to the first slicer 110, then the predetermined ratio may be set to a value greater than 0.6, e.g., the predetermined ratio may be selected from a range between 0.6 and 0.95, or from a range between 0.8 and 0.9.

The reference level generator 130 is coupled to the duty ratio controller 120 for generating a second reference level RL2 corresponding to the first reference level RL1. For example, the second reference level RL2 is greater than the first reference level RL1 by a first increment in one embodiment. The reference level generator 130 may simply superimpose the first increment on the first reference level RL1 to generate the second reference level RL2. In this embodiment, the reference level generator 130 also generates a third reference level RL3 corresponding to the first reference level. Specifically, the third reference level RL3 of this embodiment is greater than the first reference level RL1 by a second increment. Similarly, the reference level generator 130 may simply superimpose the second increment on the first reference level RL1 to generate the third reference level RL3. If the push-pull signal is inverted before being applied to the first slicer 110, then both the second reference level RL2 and the third reference level RL3 generated from the reference level generator 130 are less than the first reference level RL1.

As shown in FIG. 1, both the second slicer 140 and the third slicer 150 are coupled to the reference level generator 130. The second slicer 140 is arranged for generating a first pre-pit signal PPS1 corresponding to the push-pull signal based on the second reference level RL2. The third slicer 150 is arranged for generating a second pre-pit signal PPS2 corresponding to the push-pull signal based on the third reference level RL3. In this embodiment, the second slicer 140 slices the push-pull signal based on the second reference level RL2 to generate the first pre-pit signal PPS1, and the third slicer 150 slices the push-pull signal based on the third reference level RL3 to generate the second pre-pit signal PPS2.

The values of the second reference level RL2 and the third reference level RL3 are determined by the uses of the first pre-pit signal PPS1 and the second pre-pit signal PPS2, respectively. For example, suppose that the first pre-pit signal PPS1 is for decoding address information of the optical storage medium and the second pre-pit signal PPS2 is for generating a recording/reproducing clock signal. In this case, it is preferable that the second reference level RL2 is as low as possible to reliably detect the land pre-pits. On the other hand, it is preferable that the third reference level RL3 is as high as possible to reduce the influence of noise, i.e., to improve the noise immunity of the second pre-pit signal PPS2. To achieve the above purpose, the first increment can be set to a value less than the second increment.

Figure 2:
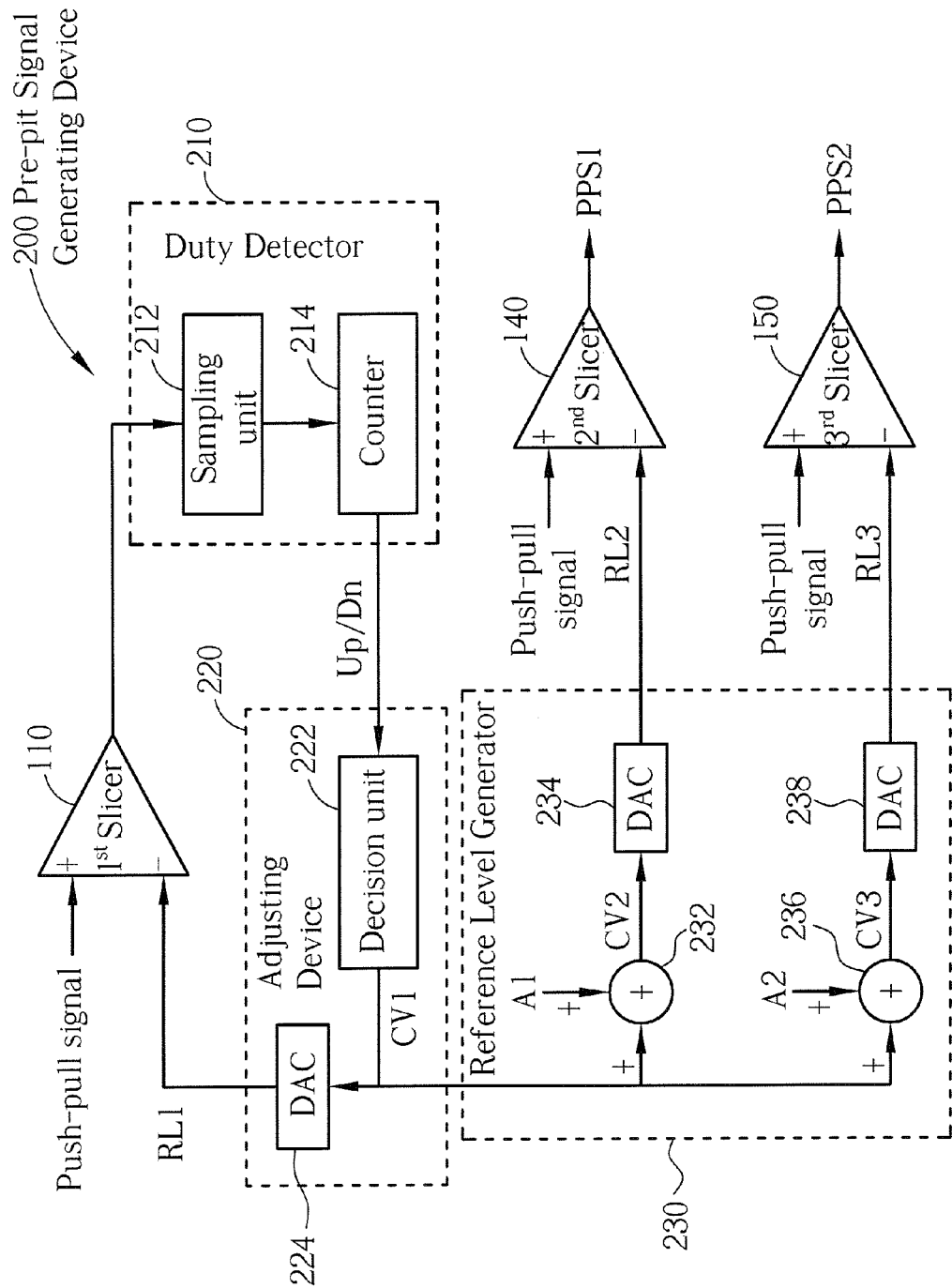
FIG. 2 is a first embodiment of the pre-pit signal generating device of FIG. 1.

FIG. 2 illustrates a block diagram of a pre-pit signal generating device 200 being a first embodiment of the pre-pit signal generating device 100. As shown in FIG. 2, the pre-pit signal generating device 200 comprises the first slicer 110, a duty detector 210, an adjusting device 220, a reference level generator 230, the second slicer 140, and the third slicer 150. The duty detector 210 and the adjusting device 220 are employed to function as a duty ratio controller.

In this embodiment, the duty detector 210 comprises a sampling unit 212 coupled to the output of the first slicer 110 and a counter 214 coupled to the sampling unit 212 and the adjusting device 220. The adjusting device 220 comprises a decision unit 222 and a first digital-to-analog converter (DAC) 224. The decision unit 222 is coupled to the duty detector 210 for generating a first control value CV1 according to the detecting result of the duty detector 210. The first DAC 224 is coupled to and disposed between the decision unit 222 and the first slicer 110 for generating and adjusting the first reference level RL1 according to the first control value CV1.

Hereinafter, the operations of the duty detector 210 and the adjusting device 220 will be described in more detail.

The sampling unit 212 of the duty detector 210 is arranged for sampling the sliced signal according to a predetermined sampling clock to generate a sampled signal, and the counter 214 is employed for counting the pulses of the sampled signal within a predetermined period. The predetermined sampling clock may be the channel bit clock, a frequency-divided clock derived from the channel bit clock, or any other clock signal capable of being utilized for sampling the sliced signal.

In a preferred embodiment, the counter 214 of the duty detector 210 is loaded with a predetermined initial value before the counting operation. The predetermined initial value is a difference between an upper limit of the counter 214 and a predetermined threshold. As a result, if the number of pulses of the sampled signal counted by the counter 214 within the predetermined period is greater than the predetermined threshold, a counter overflow results. In this embodiment, an Up signal is generated from the counter 214 when the counter overflow occurs. The Up signal is employed for indicating that the first reference level RL1 needs to be adjusted upward. On the contrary, a Dn signal is generated from the counter 214 if the counter overflow does not occur. The Dn signal is employed for indicating that the first reference level RL1 needs to be adjusted downward. In practice, the predetermined threshold loaded into the counter 214 may be adjusted with the rotation speed of the optical storage medium.

In another embodiment, the counter 214 of the duty detector 210 simply counts the pulses of the sampled signal from the sampling unit 212 to generate a count value. Then, the duty detector 210 utilizes a calculating unit (not shown) to calculate a difference between the count value and the predetermined threshold.

According to the foregoing descriptions, it can be appreciated that the detecting result of the duty detector 210 may be represented in various forms, such as in the form of Up/Dn signal generated from the counter 214 or in the form of difference between the count value from the counter 214 and the predetermined threshold. In one aspect, the detecting result of the duty detector 210 is determined by the counter 214.

As described previously, the adjusting device 220 of this embodiment comprises the decision unit 222 and the first DAC 224. In practice, the decision unit 222 may be a backward-forward counter for generating a count value as the first control value CV1 according to the detecting result of the duty detector 210, such as the Up/Dn signal or the difference mentioned above. For example, the backward-forward counter may increase the first control value CV1 by one when it receives an Up signal from the counter 214 of the duty detector 210. Similarly, the backward-forward counter may decrease the first control value CV1 by one when it receives a Dn signal from the duty detector 210.

In another embodiment, the decision unit 222 is implemented with a digital integrator for performing an integration operation based on the Up/Dn signal or the difference from the duty detector 210 to produce the first control value CV1.

Additionally, an IIR (infinite impulse response) filter may be arranged following the decision unit 222 for smoothing the change of the first control value CV1.

Hereinafter, the implementations of the reference level generator 230 will be explained in more detail.

As shown in FIG. 2, the reference level generator 230 comprises: a first computing unit 232 coupled to the decision unit 222 for increasing the first control value CV1 with a first offset A1 to generate a second control value CV2; a second DAC 234 coupled to and disposed between the first computing unit 232 and the second slicer 140 for generating and adjusting the second reference level RL2 according to the second control value CV2; a second computing unit 236 coupled to the decision unit 222 for increasing the first control value CV1 with a second offset A2 to generate a third control value CV3; and a third DAC 238 coupled to and disposed between the second computing unit 236 and the third slicer 150 for generating and adjusting the third reference level RL3 according to the third control value CV3. The first and second computing units 232 and 236 may be implemented by adders.

Figure 3:
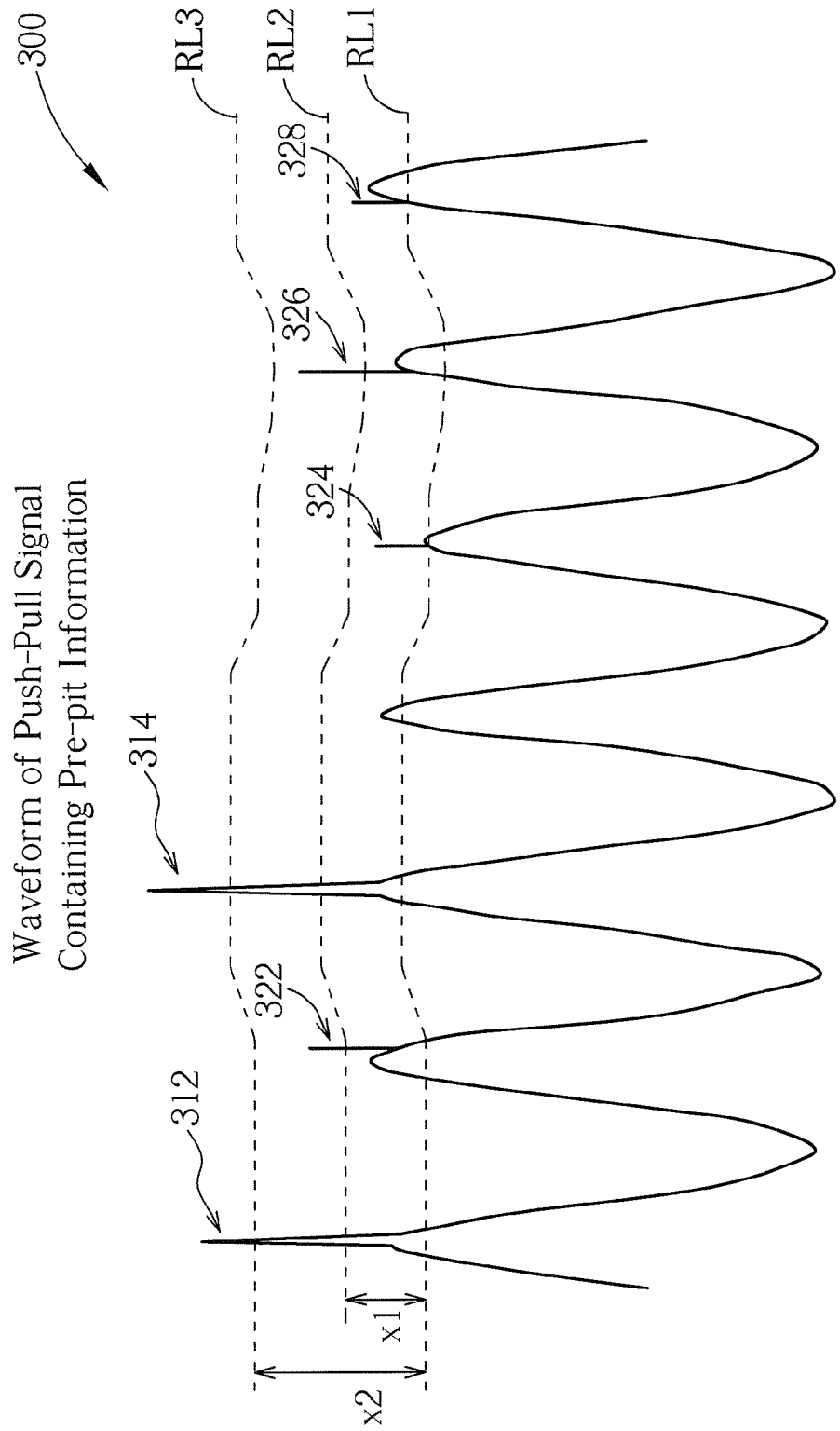
FIG. 3 is a schematic diagram of waveform of a push-pull signal containing pre-pit information.

FIG. 3 shows a schematic diagram of waveform of a push-pull signal 300 containing pre-pit information according to one embodiment. Within the push-pull signal 300, two land pre-pit signals 312 and 314 are piggybacked onto the wobble signal component of the push-pull signal 300. Signals 322, 324, 326, and 328 are noises within the push-pull signal 300. As shown in FIG. 3, the first reference level RL1 generated from the duty ratio controller 120 is not constant. This is because the duty ratio controller 120 adjusts the first reference level RL1 to control the duty ratio of the sliced signal generated from the first slicer 110 to the predetermined ratio. Therefore, the first reference level RL1 varies with the waveform of the push-pull signal 300.

As shown in FIG. 3, both the second reference level RL2 and the third reference level RL3 are beyond the peak level of the wobble signal components of the push-pull signal 300. In this embodiment, the second reference level RL2 generated from the second DAC 234 is greater than the first reference level RL1 by a first increment x1. The third reference level RL3 generated from the third DAC 238 is greater than the first reference level RL1 by a second increment x2 being greater than the first increment x1. To achieve this, the first offset A1 employed by the first computing unit 232 can be set to be less than the second offset A2 employed by the second computing unit 236.

In such a configuration, the land pre-pits of the optical storage medium can be reliably detected from the first pre-pit signal PPS1 to improve the decoding performance of the address information of the optical storage medium. In addition, the noise immunity of the second pre-pit signal PPS2 for use in the clock generation purpose is significantly improved.

Figure 4:
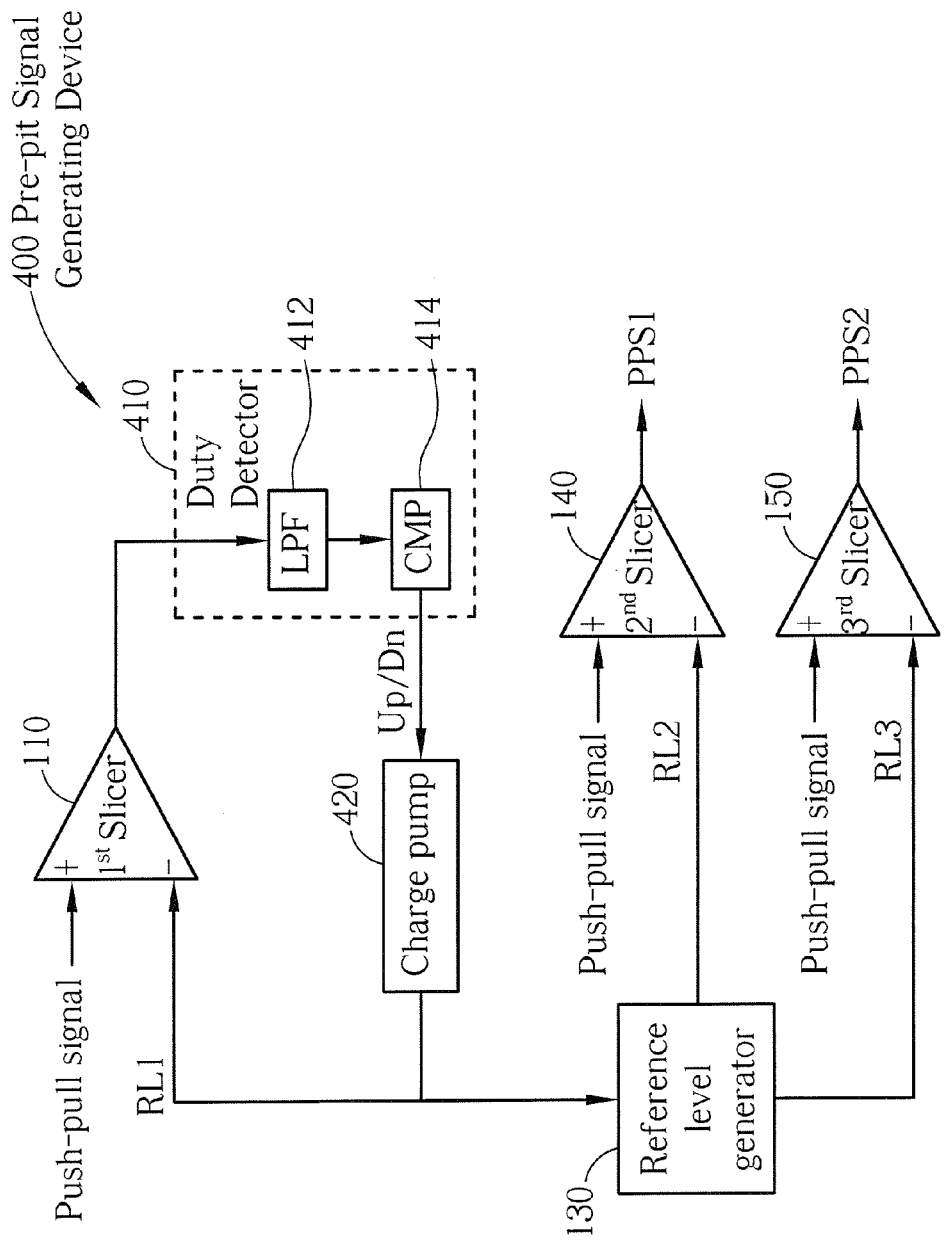
FIG. 4 is a second embodiment of the pre-pit signal generating device of FIG. 1.

Please refer to FIG. 4, which shows a block diagram of a pre-pit signal generating device 400 being a second embodiment of the pre-pit signal generating device 100. Since the pre-pit signal generating device 400 is similar to the previous embodiments, components having the same implementations and operations as that of the previous embodiments are labeled the same for the sake of clarity.

In the pre-pit signal generating device 400, a duty detector 410 cooperates with an adjusting device 420 to function as a duty ratio controller. As shown, the duty detector 410 comprises a low-pass filter (hereinafter referred to as LPF) 412 for low-pass filtering the sliced signal from the first slicer 110 to generate a filtered signal; a comparator (hereinafter referred to as CMP) 414 coupled to the LPF 412 for comparing the filtered signal with a predetermined value to determine if an Up signal or a Dn signal will be generated by the CMP 414 In this embodiment, the adjusting device 420 is implemented with a charge pump for generating a first reference level RL1 according to the Up/Dn signal from the CMP 414. In practice, the charge pump 426 may be replaced with an analog integrator. The operations of other components of the pre-pit signal generating device 400 are similar to the foregoing embodiments and further details are therefore omitted for brevity.

In the foregoing embodiments, the second slicer 140 and the third slicer 150 are employed by the pre-pit signal generating device to generate the pre-pit signals PPS1 and PPS2, respectively. This is merely an exemplary embodiment rather than a restriction of the practical implementations. In practice, the pre-pit signal generating device may arrange a single slicer following the reference level generator to slice the push-pull signal based on a reference level RL4 corresponding to the first reference level RL1 to generate a pre-pit signal for use in both the decoding of address information and the generation of the recording/reproducing clock signal. Preferably, the reference level RL4 is set to a level between RL2 and RL3.

Note that, the duty controllers of the foregoing embodiments adaptively adjust the first reference level RL1 in order to control the duty ratio of the sliced signal generated from the first slicer. This is merely an example rather than a restriction of the practical implementations. In practice, the duty controller may instead adjust the push-pull signal inputting to the first slicer to control the duty ratio of the sliced signal.

Figure 5:
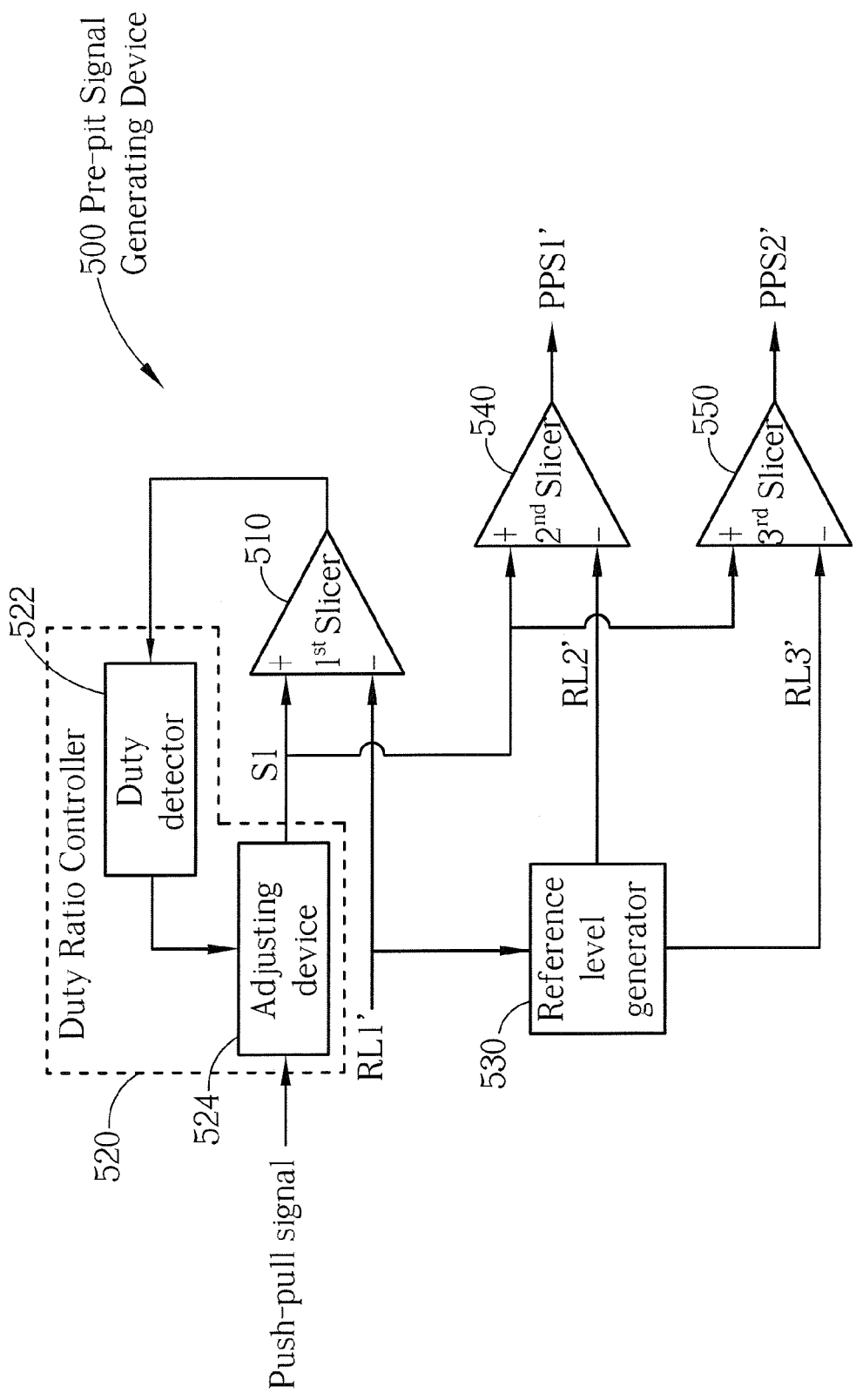
FIG. 5 is a simplified block diagram of a pre-pit signal generating device according to another embodiment.

For example, FIG. 5 shows a block diagram of a pre-pit signal generating device 500 according to another embodiment. The pre-pit signal generating device 500 comprises a first slicer 510, a duty ratio controller 520, a reference level generator 530, a second slicer 540, and a third slicer 550. Similar to the forgoing embodiments, the first slicer 510 slices a push-pull signal based on a first reference level RL1' to produce a sliced signal. A difference between this embodiment and previous embodiments is that the duty ratio controller 520 of this embodiment is arranged for adjusting the push-pull signal coupling to the first slicer 510 utilizing feedback control approach in order to control the duty ratio of the sliced signal generated from the first slicer 510.

As shown, the duty ratio controller 520 comprises a duty detector 522 for detecting a duty ratio of a sliced signal; and an adjusting device 524 coupled to the duty detector 522 for adjusting the push-push signal according to the detecting result of the duty detector 522 to control the duty ratio of the sliced signal. The implementations and operations of the duty detector 522 are similar to the above-mentioned duty detector 122, 210, or 410, and further details are thus omitted herein for brevity. In practice, the adjusting device 524 may adjust the gain or DC level of the push-pull signal coupling to first slicer 510 according to the detecting result of the duty detector 522. It should be appreciated by those of ordinary skill in the art that an adjusted signal generated from the adjusting device 524 is still an analog push-pull signal. For the purpose of explanatory convenience in the following description, the adjusted push-pull signal generated from the adjusting device 524 is labeled with S1. Hereinafter, some different implementations of the duty ratio controller 520 will be described with reference to FIG. 6 and FIG. 7.

Figure 6:
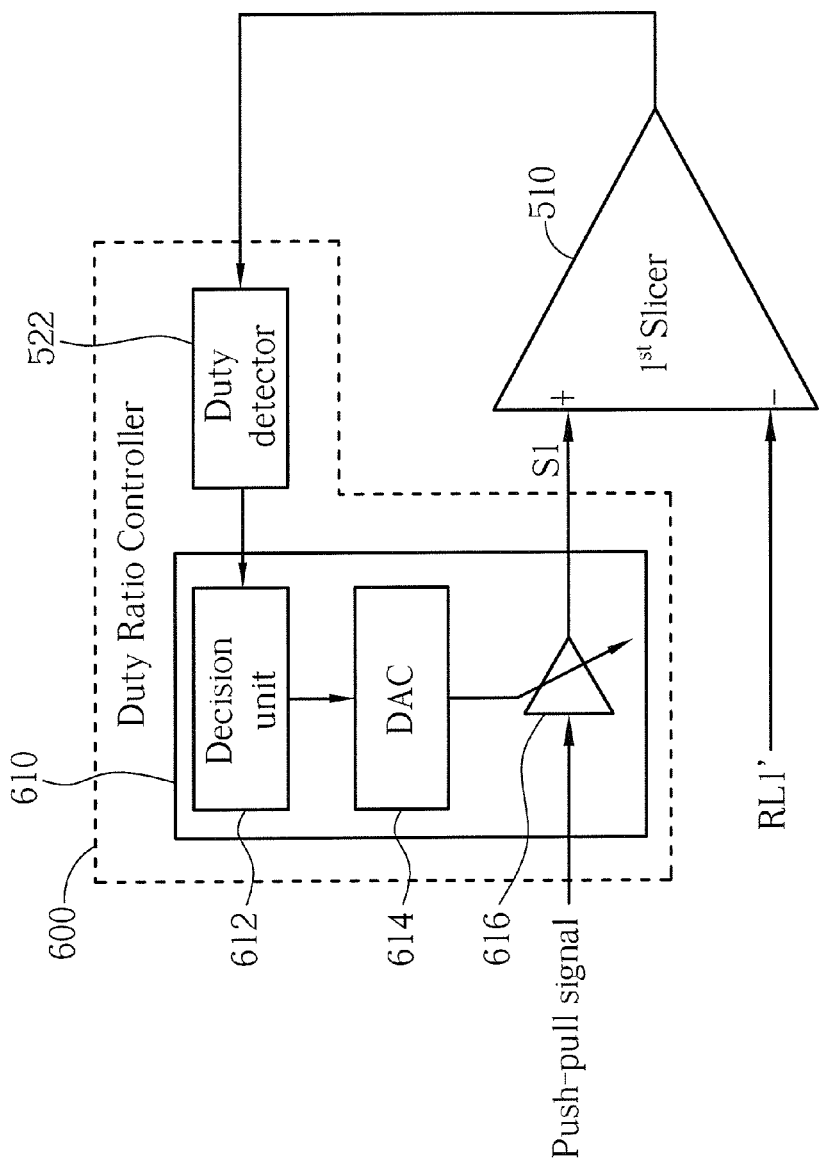
FIG. 6 is a block diagram of a duty ratio controller of FIG. 5 according to a first embodiment.

FIG. 6 shows a block diagram of a duty ratio controller 600 being a first embodiment of the duty ratio controller 520. The duty ratio controller 600 comprises the duty detector 522 and an adjusting device 610. In this embodiment, the adjusting device 610 comprises a decision unit 612 coupled to the duty detector 522; a DAC 614 coupled to the decision unit 612; and a gain amplifier 616 coupled to the DAC 614. The decision unit 612 is arranged for generating a control value according to the detecting result of the duty detector 522, and the DAC 614 is arranged for controlling the gain amplifier 616 to adjust the gain of the push-pull signal according to the control value.

For example, when the detecting result of the duty detector 522 indicates that the duty ratio of the sliced signal is higher than the predetermined ratio, the decision unit 612 and the DAC 614 control the gain amplifier 616 to reduce the gain of the push-pull signal. On the contrary, if the detecting result of the duty detector 522 indicates that the duty ratio of the sliced signal is lower than the predetermined ratio, then the decision unit 612 and the DAC 614 control the gain amplifier 616 to increase the gain of the push-pull signal. The adjusted push-pull signal S1 is then applied to the first slicer 510. By adjusting the gain of the push-pull signal utilizing a feedback control means, the adjusting device 610 can control the duty ratio of the sliced signal generated from the first slicer 510 to a desired ratio.

Figure 7:
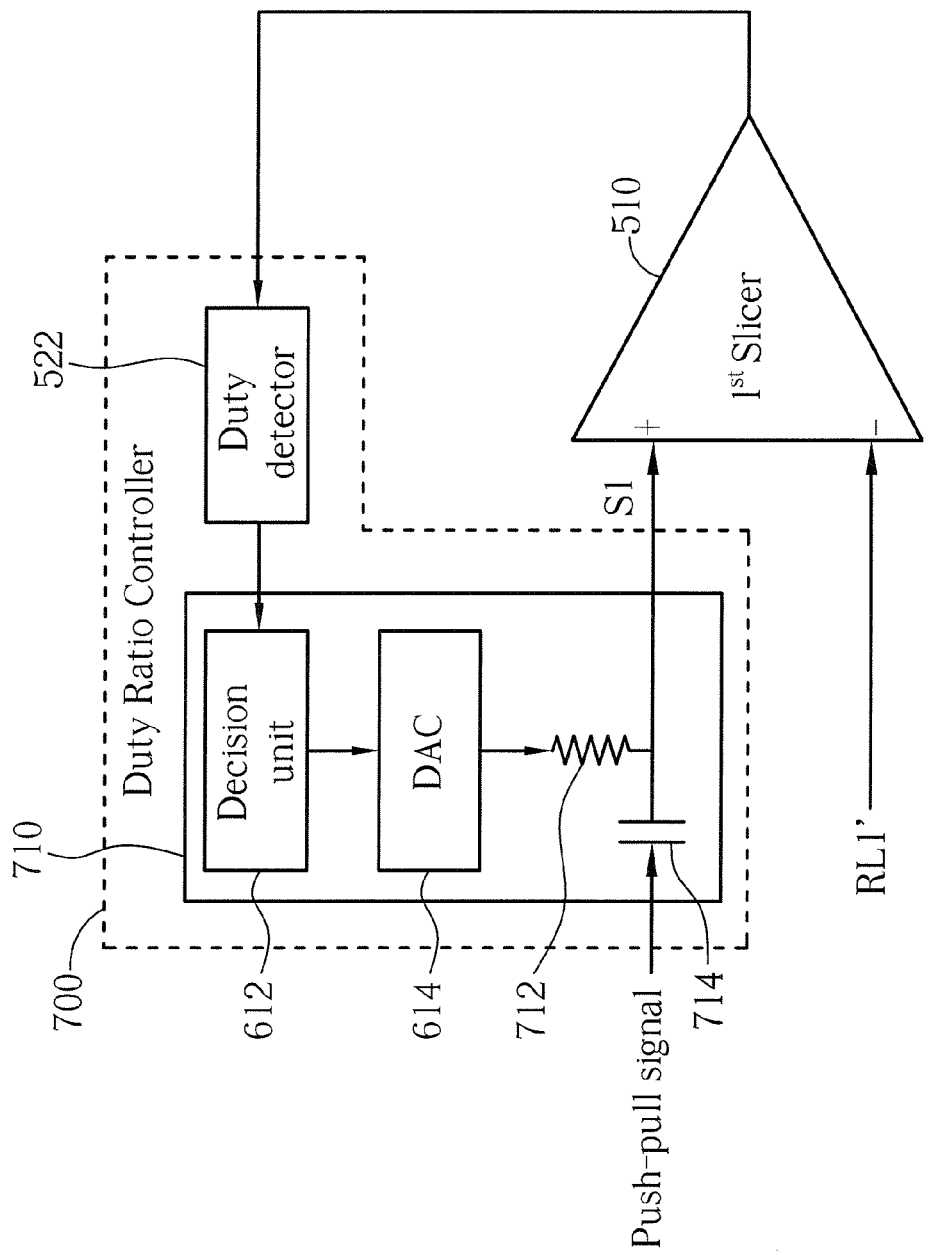
FIG. 7 is a block diagram of a duty ratio controller of FIG. 5 according to a second embodiment.

FIG. 7 shows a block diagram of a duty ratio controller 700 being a second embodiment of the duty ratio controller 520. In the duty ratio controller 700, an adjusting device 710 comprises the decision unit 612, the DAC 614, a resistor unit 712, and a capacitor unit 714. The capacitor unit 714 is arranged for blocking the DC component of the push-pull signal. In this embodiment, the DC level of the adjusted push-pull signal S1 is determined by the output of the DAC 614. In other words, the adjusting device 710 adjusts the DC level of the push-pull signal coupling to the first slicer 510 utilizing a feedback control means to control the duty ratio of the sliced signal generated from the first slicer 510.

Similar to the foregoing embodiments, the decision unit 612 and DAC 614 of the adjusting device 610 or 710 may be replaced by a charge pump or an analog integrator.

In the pre-pit signal generating device 500, the reference level generator 530 is utilized for generating a second reference level RL2' and a third reference level RL3' corresponding to the first reference level RL1'. In this embodiment, the second reference level RL2' is greater than the first reference level RL1' by a first increment, and the third reference level RL3' is greater than the first reference level RL1' by a second increment. Similar to the foregoing descriptions, if the push-pull signal is inverted before being applied to the adjusting device 524 or the adjusted push-pull signal S1 is inverted before being applied to the first slicer 510, then both the second reference level RL2' and the third reference level RL3' generated from the reference level generator 530 are less than the first reference level RL1'. The operations of the reference level generator 530 are substantially the same as the reference level generator 130 described previously.

Subsequently, the second slicer 540 generates a first pre-pit signal PPS1' corresponding to the push-pull signal based on the second reference level RL2', and the third slicer 550 generates a second pre-pit signal PPS2' corresponding to the push-pull signal based on the third reference level RL3'. In this embodiment, for example, the second slicer 540 slices the adjusted push-pull signal S1 generated from the duty ratio controller 520 based on the second reference level RL2' to generate the first pre-pit signal PPS1', and the third slicer 550 slices the adjusted push-pull signal S1 based on the third reference level RL3' to generate the second pre-pit signal PPS2'.

As described previously, the combination of the first slicer and the duty ratio controller of the foregoing pre-pit signal generating devices functions as a duty ratio control loop. In practical applications, the architecture of the disclosed duty ratio control loop can also be applied in the detection of header regions of an optical storage medium, such as a DVD-RAM disc.

Figure 8:
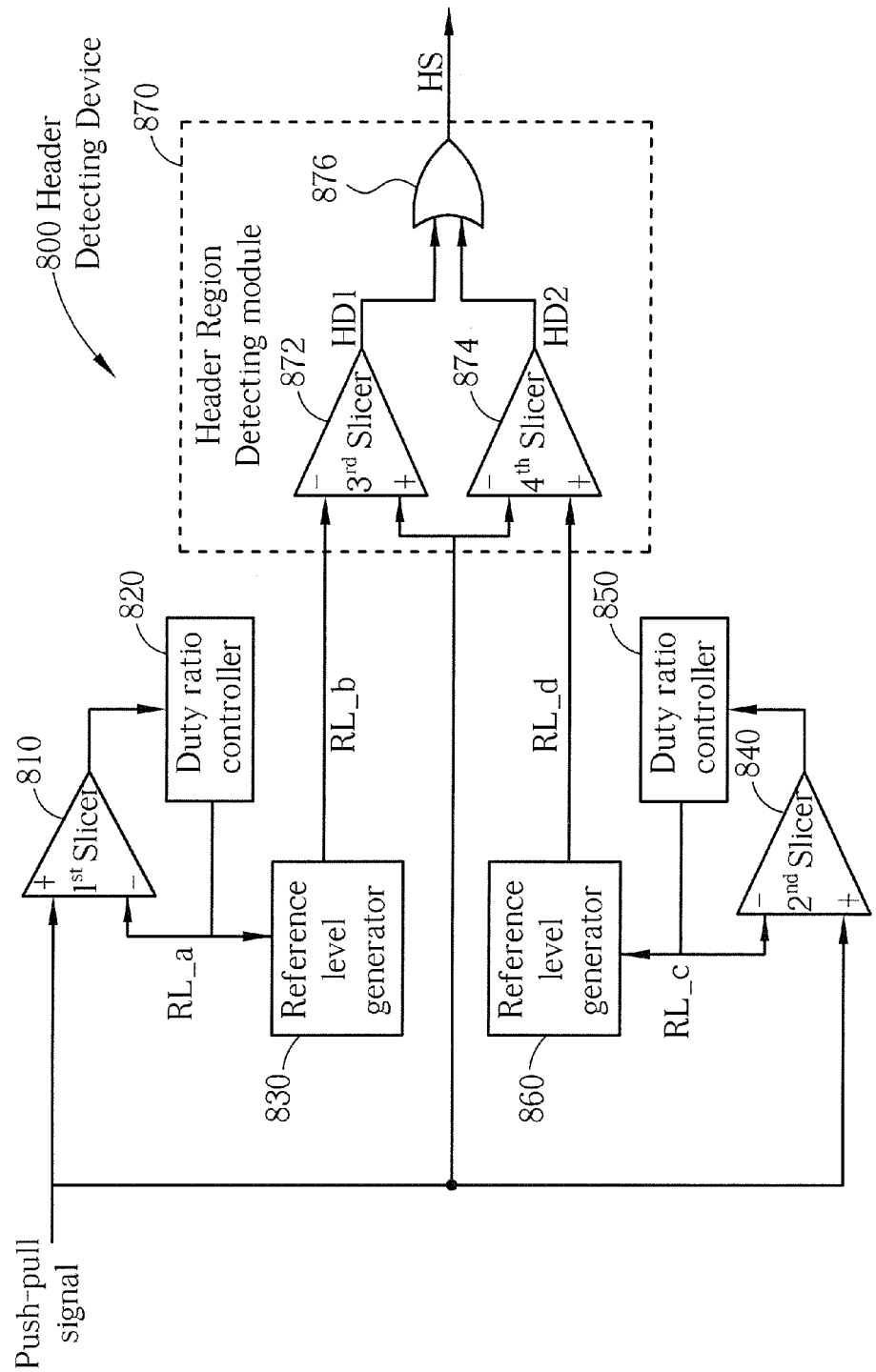
FIG. 8 is a block diagram of a detecting device for detecting a header region of an optical storage medium according to one embodiment.
Figure 10:
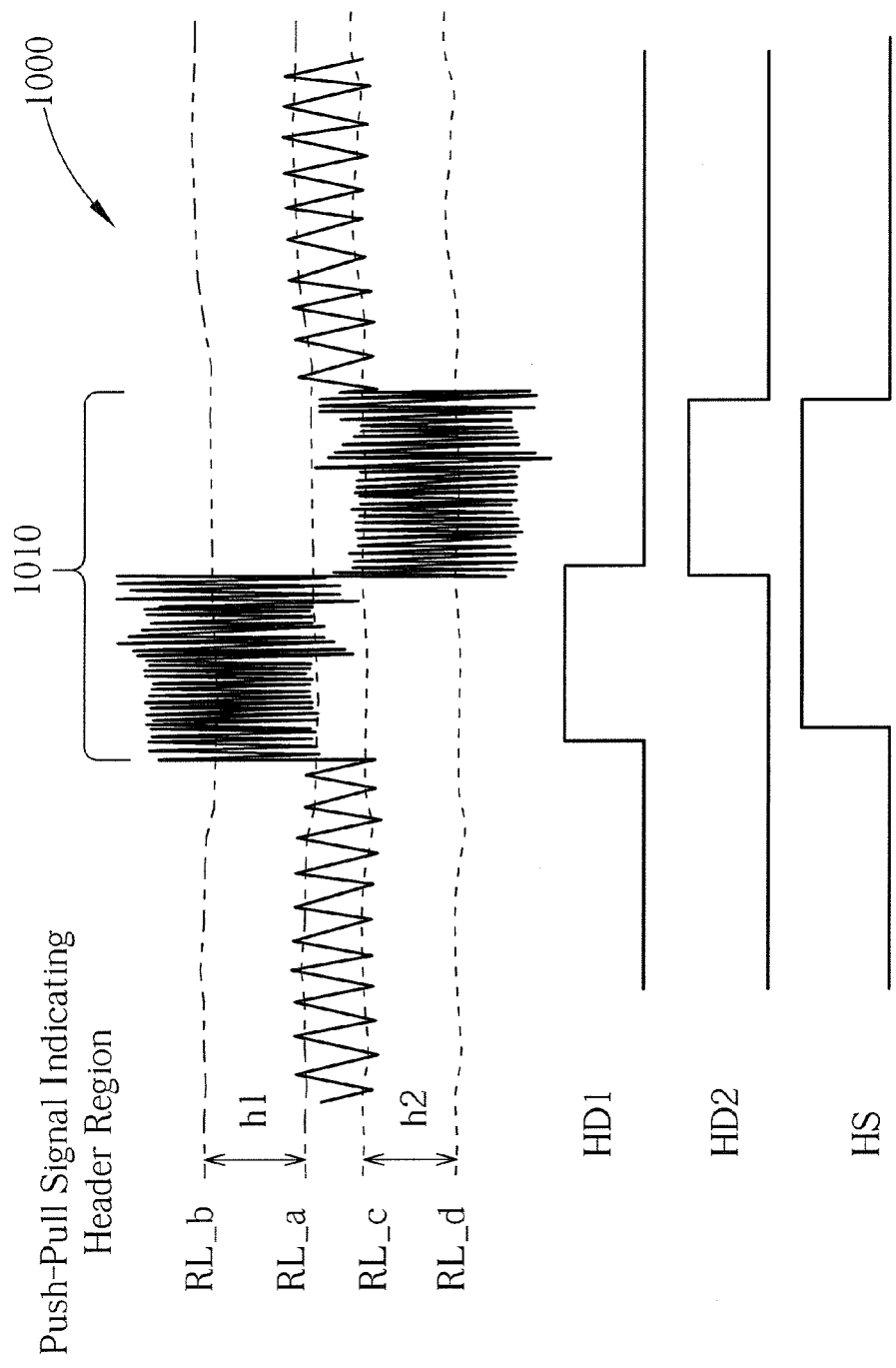
FIG. 10 is a schematic diagram illustrating the detection of a header region.

Please refer to FIG. 8 and FIG. 10. FIG. 8 is a block diagram of a detecting device 800 for detecting a header region of an optical storage medium according to an exemplary embodiment. FIG. 10 shows a schematic diagram illustrating the detection of a header region. As shown in FIG. 10, a rapid signal change occurs in a header region 1010 of a push-pull signal 1000 due to the high frequency signal of the header information recorded in the header region 1010.

The detecting device 800 comprises a first slicer 810 for slicing a push-pull signal retrieved from the optical storage medium based on a first reference level RL_a to generate a first sliced signal; a first duty ratio controller 820 coupled to the first slicer 810 for adjusting the first reference level RL_a to control a duty ratio of the first sliced signal to a first predetermined ratio; and a first reference level generator 830 coupled to the first duty ratio controller 820 for generating a second reference level RL_b being greater than the first reference level RL_a by a first offset h1. Obviously, the cooperation of the first slicer 810 and the first duty ratio controller 820 functions as a duty ratio control loop for controlling the duty ratio of the first sliced signal.

The detecting device 800 also comprises a second slicer 840 for slicing the push-pull signal based on a third reference level RL_c to generate a second sliced signal; a second duty ratio controller 850 coupled to the second slicer 840 for adjusting the third reference level RL_c to control a duty ratio of the second sliced signal to a second predetermined ratio greater than the first predetermined ratio; and a second reference level generator 860 coupled to the second duty ratio controller 850 for generating a fourth reference level RL_d being less than the third reference level RL_c by a second offset h2. Similarly, the cooperation of the second slicer 840 and the second duty ratio controller 850 functions as a duty ratio control loop for controlling the duty ratio of the second sliced signal.

In this embodiment, the first reference level RL_a approximates the peak level of the wobble signal section within the push-pull signal while the third reference level RL_c approximates the bottom level of the wobble signal section. To achieve this, the first predetermined ratio can be set to a value less than 0.4 and the second predetermined ratio can be set to a value greater than 0.6. For example, the first predetermined ratio may be selected from a range between 0.05 and 0.4, and the second predetermined ratio may be selected from a range between 0.6 and 0.95. Preferably, the first predetermined ratio is between 0.1 and 0.2, and the second predetermined ratio is between 0.8 and 0.9.

Additionally, the detecting device 800 further comprises a header region detecting module 870 coupled to the first and second reference level generators 830 and 860 for detecting a header region of the push-pull signal according to the second and fourth reference levels RL_b and RL_d. In this embodiment, the header region detecting module 870 comprises a third slicer 872 coupled to the first reference level generator 830 for slicing the push-pull signal based on the second reference level RL_b to generate a first detection signal HD1; a fourth slicer 874 coupled to the second reference level generator 860 for slicing the push-pull signal based on the fourth reference level RL_d to generate a second detection signal HD2; and a determining unit 876 coupled to the third and fourth slicers 872 and 874 for generating a header signal HS according to the first and second detection signals HD1 and HD2.

In this embodiment, the portion of a high level in the first detection signal HD1 indicates the left half portion of the header region 1010. The portion of a high level in the second detection signal HD2 indicates the right half portion of the header region 1010. By way of example, the determining unit 876 may be implemented by an OR gate for performing a logic OR operation on the first and second detection signals HD1 and HD2 to generate the header signal HS, in which the portion of a high level in the header signal HS indicates the position of the header region 1010.

Figure 9:
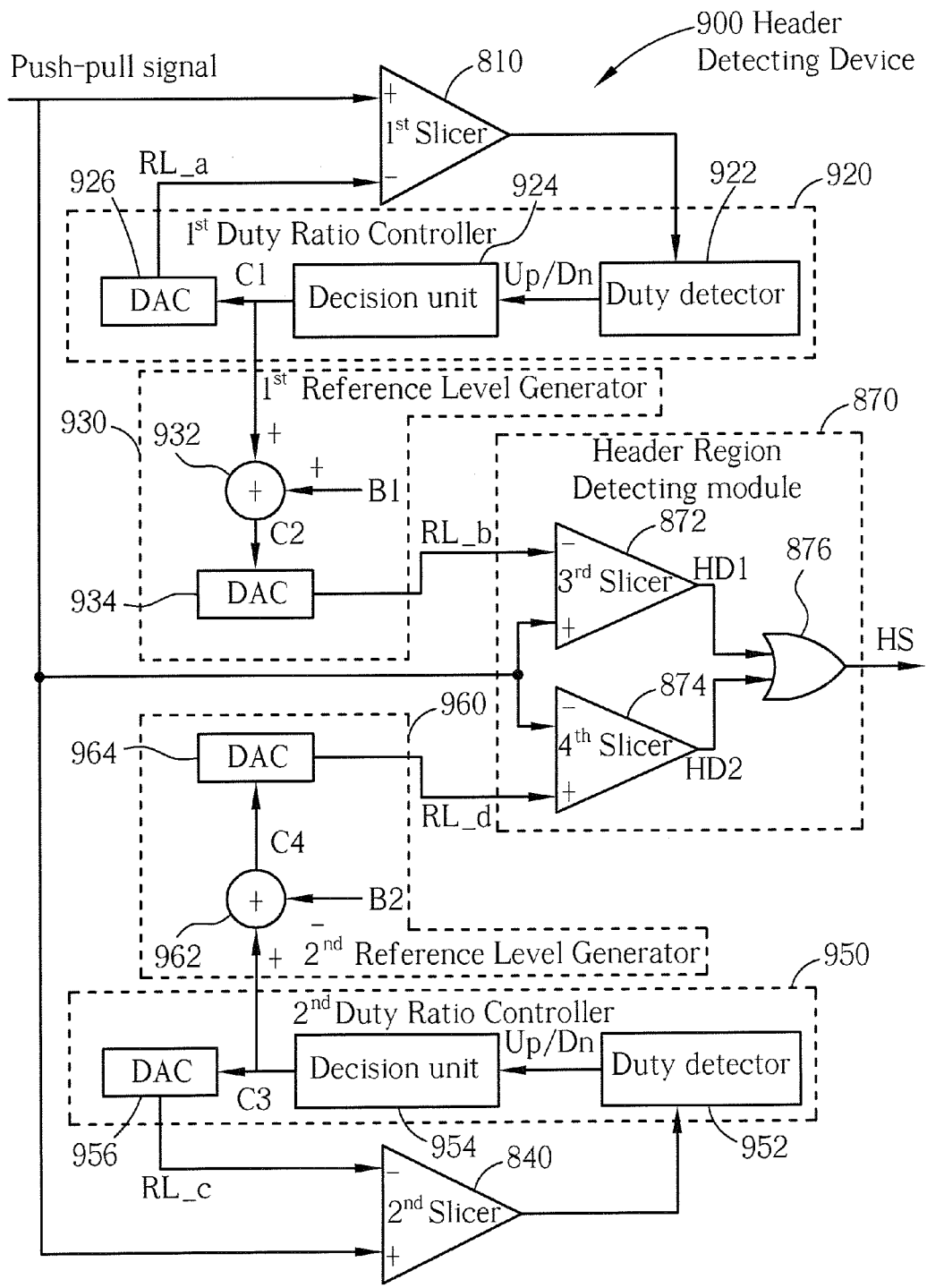
FIG. 9 is an exemplary embodiment of the detecting device of FIG. 8.

FIG. 9 shows a block diagram of a detecting device 900 being an exemplary embodiment of the detecting device 800. The detecting device 900 comprises the first slicer 810, a first duty ratio controller 920, a first reference level generator 930, the second slicer 840, a second duty ratio controller 950, a second reference level generator 960, and the header region detecting module 870.

In this embodiment, the first duty ratio controller 920 comprises a duty detector 922 for detecting a duty ratio of the sliced signal generated from the first slicer 810; a decision unit 924 for generating a first control value C1 according to the detecting result of the duty detector 922, and a DAC 926 for generating and adjusting the first reference level RL_a according to the first control value C1. The first reference level generator 930 comprises a computing unit 932 for increasing the first control value C1 by an offset B1 to generate a second control value C2; and a DAC 934 for generating and adjusting the second reference level RL_b according to the second control value C2. The implementations and operations of the first duty ratio controller 920 and the first reference level generator 930 are similar to the disclosed embodiments. Therefore, further details are omitted for brevity.

The second duty ratio controller 950 comprises a duty detector 952 for detecting a duty ratio of the sliced signal generated from the second slicer 840; a decision unit 954 for generating a third control value C3 according to the detecting result of the duty detector 952, and a DAC 956 for generating and adjusting the third reference level RL_c according to the third control value C3. The second reference level generator 960 comprises a computing unit 962 for decreasing the third control value C3 by an offset B2 to generate a fourth control value C4; and a DAC 964 for generating and adjusting the fourth reference level RL_d according to the fourth control value C4.

In practice, the first duty ratio controller 820 or the second duty ratio controller 850 of the detecting device 800 may be instead implemented by analog techniques as the disclosed architecture shown in FIG. 4.

According to FIG. 10, it can be appreciated that the second reference level RL_b and the fourth reference level RL_d are nearly symmetrical with respect to the DC level of the push-pull signal 1000. Therefore, the symmetrical architecture of the detecting device 800 or 900 can be further simplified to reduce the complexity of the circuitry.

Figure 11:
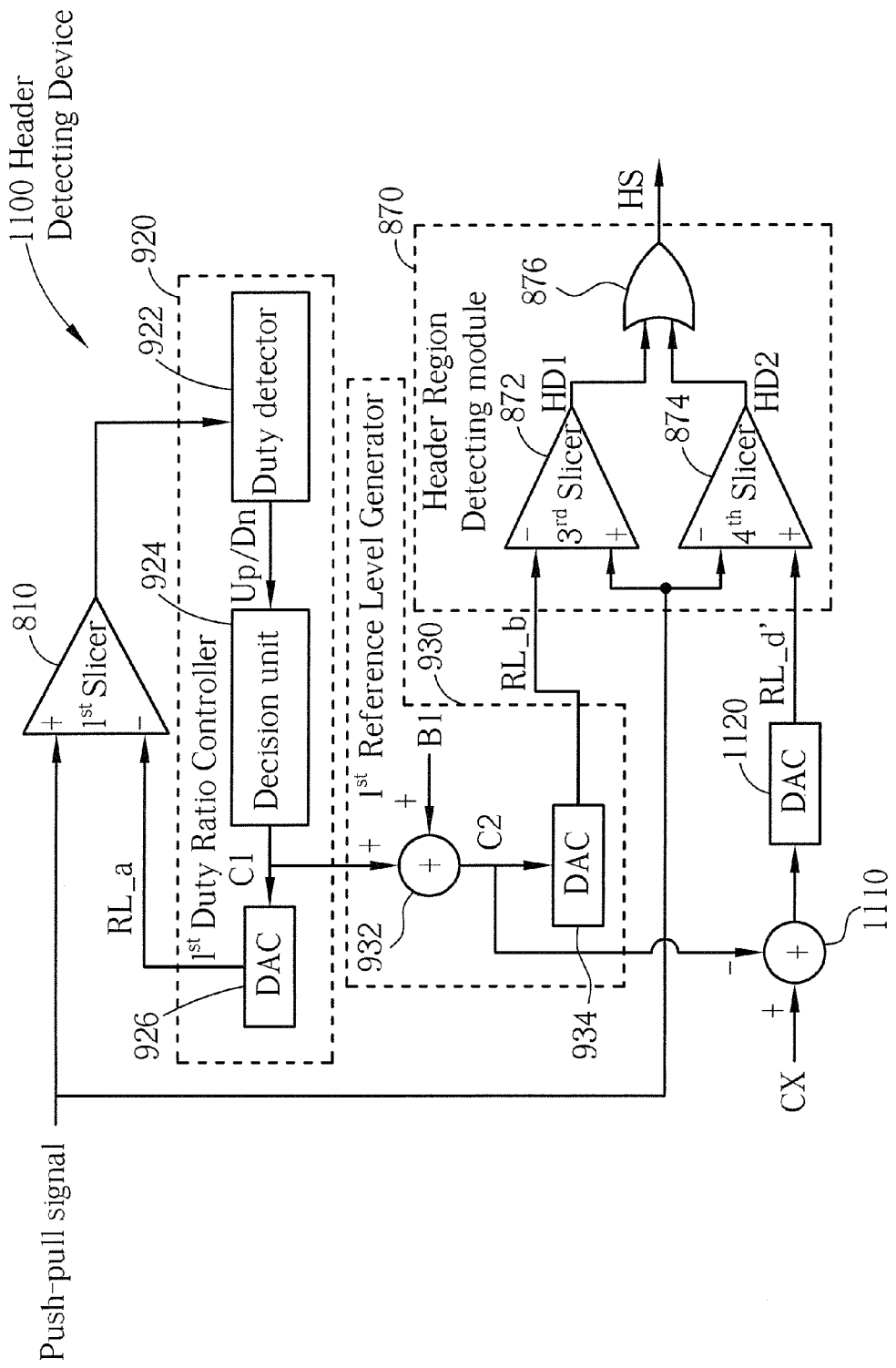
FIG. 11 is a block diagram of a simplified detecting device according to a first embodiment.

For example, FIG. 11 shows a block diagram of a detecting device 1100 being a simplified version of the detecting device 900. As shown, a computing unit 1110 and a DAC 1120 are employed in the detecting device 1100 to generate a reference level RL_d' to be applied to the fourth slicer 874. The DAC 1120 of this embodiment is substantially the same as the DAC 934 of the first reference level generator 930. In FIG. 11, CX denotes a digital control value corresponding to the full scale of the DAC 934 or 1120. The computing unit 1110 generates a control value by subtracting the second control value C2 corresponding to the second reference level RL_b from the digital control value CX. Subsequently, the DAC 1120 generates the reference level RL_d' according to the control value generated from the computing unit 1110. As a result, the reference level RL_d' and the second reference level RL_b will be nearly symmetrical with respect to the DC level of the push-pull signal 1000.

Figure 12:
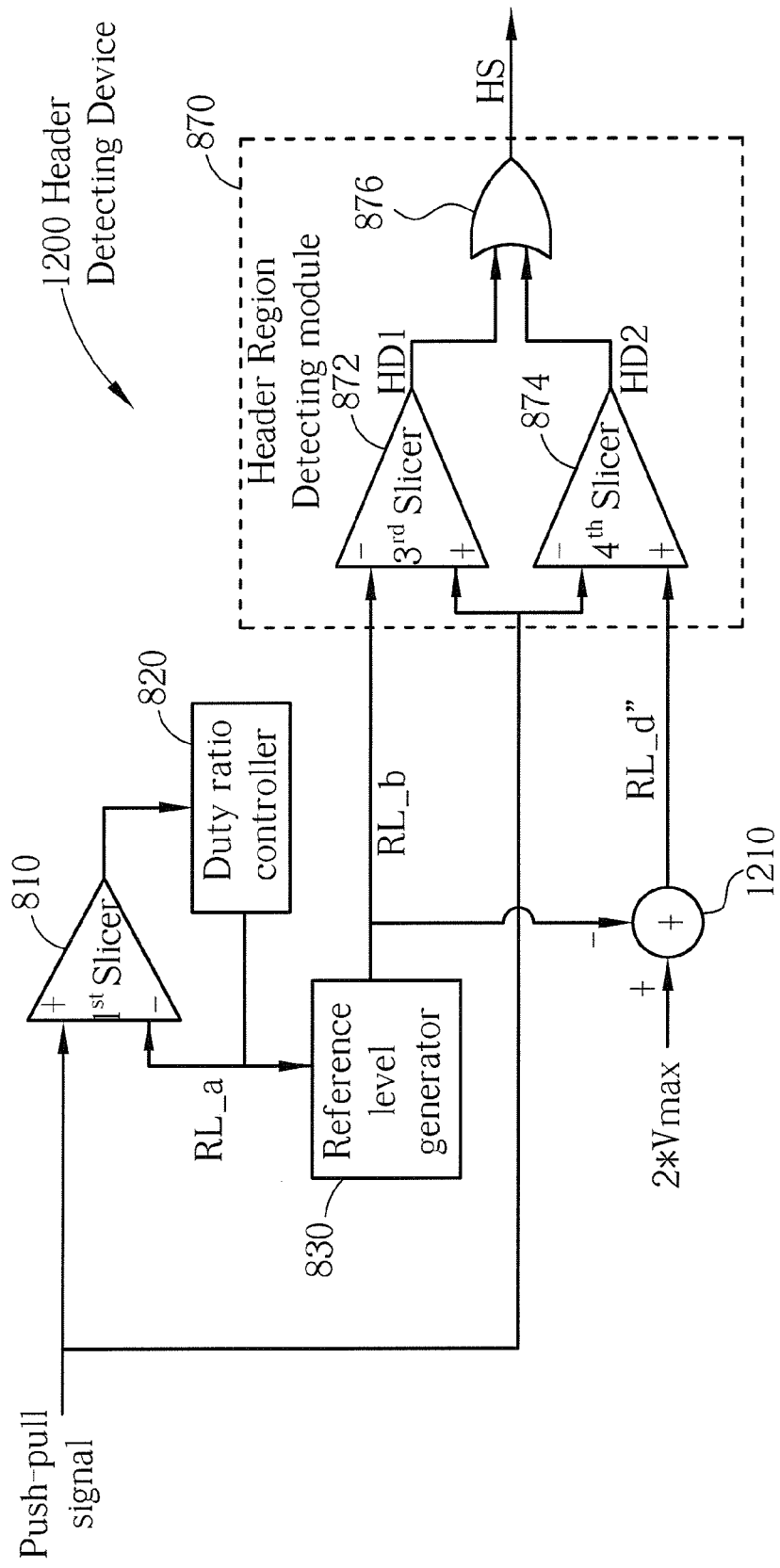
FIG. 12 is a block diagram of a simplified detecting device according to a second embodiment.

FIG. 12 shows a block diagram of a detecting device 1200 being a simplified version of the detecting device 800. In FIG. 12, Vmax denotes the maximum amplitude of the push-pull signal 1000. In this embodiment, a computing unit 1210 is employed for subtracting the second reference level RL_b from two times of Vmax to generate a reference level RL_d". As a result, the reference level RL_d" and the second reference level RL_b will be nearly symmetrical with respect to the DC level of the push-pull signal 1000.

In practice, the duty ratio control loop of the detecting device 800, 900, 1100, or 1200 may be instead implemented with the architecture shown in FIG. 5.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A pre-pit signal generating device comprising:
a first slicer for generating a sliced signal corresponding to a push-pull signal and a first reference level;
a duty ratio controller coupled to receive the sliced signal for adjusting the first reference level or the push-pull signal to control a duty ratio of the sliced signal to a predetermined ratio;
a reference level generator coupled to receive the first reference level output from the duty ratio controller for generating a second reference level corresponding to the first reference level; and
a second slicer coupled to receive the second reference signal and the push-pull signal for generating a first pre-pit signal corresponding to the push-pull signal and the second reference level.

2. The pre-pit signal generating device of claim 1, wherein the reference level generator generates a third reference level corresponding to the first reference level, and the pre-pit signal generating device further comprises:
a third slicer coupled to receive the third reference signal and the push-pull signal for generating a second pre-pit signal corresponding to the push-pull signal and the third reference level.

3. The pre-pit signal generating device of claim 2, wherein the first pre-pit signal is for decoding address information of an optical storage medium, the second pre-pit signal is for generating a recording/reproducing clock signal.

4. The pre-pit signal generating device of claim 1, wherein the duty ratio controller comprises:
a duty detector coupled to the first slicer for detecting the duty ratio of the sliced signal; and
an adjusting device coupled to the duty detector for adjusting the first reference level or the push-pull signal according to the detecting result of the duty detector.

5. The pre-pit signal generating device of claim 4, wherein the duty detector comprises:
a sampling unit for sampling the sliced signal to generate a sampled signal; and
a counter coupled to the sampling unit and the adjusting device for determining the detecting result by counting the sampled signal.

6. The pre-pit signal generating device of claim 4, wherein the duty detector comprises:
a low-pass filter for low-pass filtering the sliced signal to generate a filtered signal; and
a comparator coupled to the low-pass filter and the adjusting device for determining the detecting result by comparing the filtered signal with a predetermined value.

7. The pre-pit signal generating device of claim 4, wherein the adjusting device is a charge pump or an analog integrator.

8. The pre-pit signal generating device of claim 4, wherein the adjusting device comprises:
a decision unit coupled to the duty detector for generating a first control value according to the detecting result of the duty detector; and
a first digital-to-analog converter (DAC) coupled to the decision unit for adjusting the first reference level according to the first control value.

9. The pre-pit signal generating device of claim 8, wherein the decision unit is a counter or a digital integrator.

10. The pre-pit signal generating device of claim 8, wherein the reference level generator comprises:
a first computing unit coupled to the decision unit for adjusting the first control value with a first offset to generate a second control value; and
a second DAC coupled to the first computing unit for adjusting the second reference level according to the second control value.

11. The pre-pit signal generating device of claim 8, wherein the reference level generator comprises:
a second computing unit coupled to the decision unit for adjusting the first control value with a second offset to generate a third control value; and
a third DAC coupled to the second computing unit for adjusting a third reference level according to the third control value.

12. The pre-pit signal generating device of claim 11, further comprising:
a third slicer coupled to the third DAC for generating a second pre-pit signal corresponding to the push-pull signal based on the third reference level.

13. The pre-pit signal generating device of claim 4, wherein the adjusting device adjusts the gain or the DC level of the push-pull signal according to the detecting result of the duty detector.

14. The pre-pit signal generating device of claim 13, wherein the adjusting device comprises:
a decision unit coupled to the duty detector for generating a control value according to the detecting result of the duty detector;
a gain amplifier coupled to the first slicer; and
a first digital-to-analog converter (DAC), coupled to and disposed between the decision unit and the gain amplifier, for controlling the gain amplifier to adjust the gain of the push-pull signal according to the control value.

15. The pre-pit signal generating device of claim 13, wherein the adjusting device comprises:
a decision unit coupled to the duty detector for generating a control value according to the detecting result of the duty detector;
a first digital-to-analog converter (DAC) coupled to the decision unit for generating a DC signal according to the control value;
a resistor unit having a first and a second terminals where the first terminal is coupled to the first DAC and the second terminal is coupled to the first slicer; and
a capacitor unit having a first and a second terminals where the first terminal is coupled to the push-pull signal and the second terminal is coupled to the second terminal of the resistor unit.

16. The pre-pit signal generating device of claim 13, wherein the second slicer slices an adjusted push-pull signal generated from the adjusting device based on the second reference level to generate the first pre-pit signal.

17. The pre-pit signal generating device of claim 1, wherein the predetermined ratio is either less than 0.4 or greater than 0.6.

18. The pre-pit signal generating device of claim 1, wherein the first reference level received by the reference level generator is identical to the first reference level output from the duty ratio controller.

19. A detecting device for detecting a header region of an optical storage medium, the detecting device comprising:
a first slicer for generating a first sliced signal corresponding to a push-pull signal and a first reference level, wherein the push-pull signal is retrieved from the optical storage medium;

a first duty ratio controller coupled to receive the first sliced signal for adjusting the first reference level or the push-pull signal to control a duty ratio of the first sliced signal to a first predetermined ratio;

a first reference level generator coupled to the first duty ratio controller for generating a second reference level corresponding to the first reference level;

a second slicer coupled for generating a second sliced signal corresponding to the push-pull signal and a third reference level;

a second duty ratio controller coupled to receive the second sliced signal for adjusting the third reference level or the push-pull signal to control a duty ratio of the second sliced signal to a second predetermined ratio greater than the first predetermined ratio;

a second reference level generator coupled to the second duty ratio controller for generating a fourth reference level corresponding to the third reference level; and a header region detecting module coupled to receive the second reference level, the fourth reference level, and the push-pull signal for detecting a header region of the push-pull signal according to the second and fourth reference levels.

20. The detecting device of claim 19, wherein the header region detecting module comprises:

a third slicer coupled to receive the push-pull signal and the second reference level for generating a first detection signal corresponding to the push-pull signal and the second reference level;

a fourth slicer coupled to receive the push-pull signal and the fourth reference level for generating a second detection signal corresponding to the push-pull signal and the fourth reference level; and a determining unit coupled to the third and fourth slicers for generating a header signal according to the first and second detection signals.

21. The detecting device of claim 20, wherein the determining unit is an OR gate.

22. The detecting device of claim 19, wherein the optical storage medium is a DVD-RAM disc.

23. The detecting device of claim 19, wherein the first predetermined ratio is less than 0.4 and the second predetermined ratio is greater than 0.6.

24. The detecting device of claim 19, wherein the first duty ratio controller adjusts the gain or the DC level of the push-pull signal coupling to the first slicer to control the duty ratio of the first sliced signal.

25. The detecting device of claim 19, wherein the second duty ratio controller adjusts the gain or the DC level of the push-pull signal coupling to the second slicer to control the duty ratio of the second sliced signal.

26. A detecting device for detecting a header region of an optical storage medium, the detecting device comprising:

a slicer for generating a sliced signal corresponding to a received push-pull signal retrieved from the optical storage medium and a first reference level;

a duty ratio controller coupled to receive the sliced signal for adjusting the first reference level or the push-pull signal to control a duty ratio of the sliced signal to a predetermined ratio;

a reference level generator coupled to receive the first reference level output from the duty ratio controller for generating a second reference level corresponding to the first reference level; and a header region detecting module coupled to receive the second reference level, the push-pull signal, and a third reference level for detecting a header region of the push-pull signal according to the second reference level and the third reference level, the third reference level corresponding to the second reference level.

27. The detecting device of claim 26, wherein the duty ratio controller adjusts the gain or the DC level of the push-pull signal coupling to the slicer to control the duty ratio of the sliced signal.

28. The detecting device of claim 26, further comprising: a computing unit, coupled to the reference level generator and the header region detecting module, for subtracting the second reference level from two times of the maximum amplitude of the push-pull signal to generate the third reference level.

29. The detecting device of claim 26, wherein the second reference level and the third reference level are symmetrical with respect to the DC level of the push-pull signal.

30. The detecting device of claim 26, wherein the first reference level received by the reference level generator is identical to the first reference level output from the duty ratio controller.

31. A duty ratio control loop comprising:

a slicer for slicing an incoming signal and a reference level to generate a sliced signal; and a duty ratio controller coupled to receive the sliced signal for adjusting the reference level or the incoming signal to control a duty ratio of the sliced signal to a predetermined ratio, the duty ratio controller comprising:

a duty detector coupled to the slicer for detecting the duty ratio of the sliced signal; and an adjusting device coupled to the duty detector and the slicer for adjusting the reference level or the incoming signal according to the detecting result of the duty detector, the adjusting device comprising:

a decision unit coupled to the duty detector for generating a control value according to the detecting result of the duty detector;

a gain amplifier coupled to the slicer; and a digital-to-analog converter (DAC), coupled to and disposed between the decision unit and the gain amplifier, for controlling the gain amplifier to adjust the gain of the incoming signal according to the control value;

wherein the adjusting device adjusts the gain of the incoming signal according to the detecting result of the duty detector.

32. The duty ratio control loop of claim 31, wherein the duty detector comprises:

a sampling unit for sampling the sliced signal to generate a sampled signal; and a counter coupled to the sampling unit and the adjusting device for determining the detecting result by counting the sampled signal.

33. The duty ratio control loop of claim 31, wherein the duty detector comprises:

a low-pass filter for low-pass filtering the sliced signal to generate a filtered signal; and a comparator coupled to the low-pass filter and the adjusting device for determining the detecting result by comparing the filtered signal with a predetermined value.

34. The duty ratio control loop of claim 31, wherein the adjusting device is a charge pump or an analog integrator.

35. The duty ratio control loop of claim 31, wherein the adjusting device comprises:

a decision unit coupled to the duty detector for generating a control value according to the detecting result of the duty detector; and a digital-to-analog converter (DAC) coupled to the decision unit for adjusting the reference level according to the control value.

36. The duty ratio control loop of claim 35, wherein the decision unit is a counter or a digital integrator.

37. The duty ratio control loop of claim 31, wherein the adjusting device adjusts the DC level of the incoming signal according to the detecting result of the duty detector.

38. The duty ratio control loop of claim 37, wherein the adjusting device further comprises:

a decision unit coupled to the duty detector for generating a control value according to the detecting result of the duty detector;

a digital-to-analog converter (DAC) coupled to the decision unit for generating a DC signal according to the control value;

a resistor unit having a first and a second terminals where the first terminal is coupled to the DAC and the second terminal is coupled to the slicer; and a capacitor unit having a first and a second terminals where the first terminal is coupled to the incoming signal and the second terminal is coupled to the second terminal of the resistor unit.

* * * * *